6,255 X
L. Disbrow,
Grate.
Patented Nov. 22. 1830.
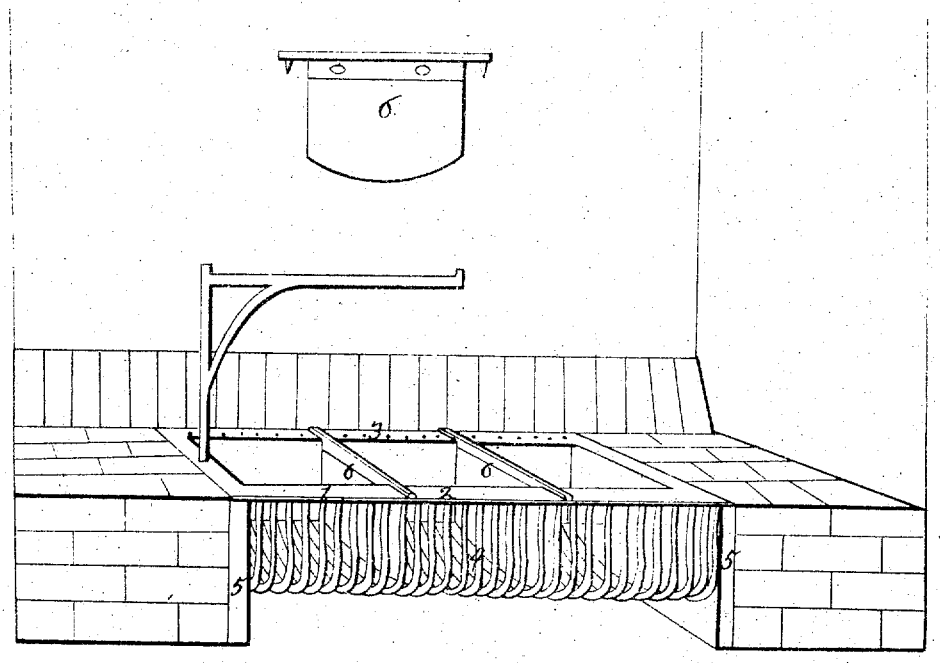

Nov 22. 1830 291

Levi Disbrow of City of New York.

6255X

Letters Patent.

The schedule referred to in these Letters Patent and making part of the same containing a description in the words of the said Levi Disbrow himself of his improvement in the kitchen grate.

To all to whom these presents shall come,

I Levi Disbrow of the City of New York and a Citizen of the United States send greeting — Be it known that I Levi Disbrow, have invented a new and useful improvement in the Kitchen Grate which I call the Jackson Grate," or Kitchen range, calculated to burn all kinds of coal for culinary purposes, for which it is principally intended, but may be used for other purposes. it being a sovereign remedy for smoky chimneys where anthracite coal is used. The following is my description of the Jackson Grate.

First. I prepare three straight flat bars of iron No. 1, 2. 3, perforated with holes. their whole lengths of equal distance, and next I prepare as many small bars as will fill the holes made in No. 1 & 2, which I call basket bars, as they take something of that shape and are seen at No. 4 in the drawing annexed are connected to No 1 in the front by being rivetted through it - next are two flat bars which I call jamb plates as No. 5 they being bent so as to form three sides of a square. the two unconnected ends serving as legs or feet for front and rear, are are connected to No. 1. which is the front and top bar, thence back to No. 3. and thence down are connected to No. 2, by rivets; next I prepare one or more plates which I call slide or division plates as No. 6, with three straight sides, while the other takes a circular form, nearly of the same circular form as the basket bars; on the top and straight side, I rivet a flat piece extending something longer than the width of the plate, with two small projecting points turned downwards when put in use, the circular one drops between the basket bars, while one of the small points falls over the front bar No. 1, and the other small point drops into a hole in the top back bar No. 3. and is held to its place by that means, but is easily removed when it is required to make a large or Port folio.

292. X6255 small fire; by this mean much fuel is saved by being kept in a compact body, and using as much length of grate as meets the occasion only. Cranes are easily attached to this kind of grate when needed, as frequently may be the case; therefore a hole is to be made down through the jamb-plate No. 5. near its centre for the post of the crane to play in, while its foot is held to its place in a hole made in a bar that passes from the front to the rear legs, and when properly set in mason work is sufficiently strong to bear the heaviest utensils commonly in use; the length and other dimensions, I make to suit the size of the fire place, according to order — The patent is not claimed, on the grate alone, but as to the manner of applying it to use In testimony that the above is a true Specification of my said invention, I have hereto set my hand and seal this twelfth day of October, in the Year of our Lord One thousand eight hundred and thirty —

Witnesses Alex Watson }
Wm. Mulock }

Levi Disbrow

Exd.
Ch.f.W.

630 [illegible]